United States Patent [19]

Dyer et al.

[11] 4,026,035
[45] May 31, 1977

[54] DRYER WITH LOW TEMPERATURE HEAT RECOVERY SYSTEM

[76] Inventors: David F. Dyer; Glennon Maples, both of Rte. 2, Box 11, Waverly, Ala. 36879

[22] Filed: Feb. 6, 1976

[21] Appl. No.: 655,694

[52] U.S. Cl. .................................. 34/23; 34/27; 34/77; 34/114; 34/119; 34/159
[51] Int. Cl.² ........................................ F26B 3/04
[58] Field of Search ............ 34/114, 119, 124, 77, 34/159, 161, 23, 35, 86, 27; 62/238; 165/90

[56] References Cited

UNITED STATES PATENTS

| | | | |
|---|---|---|---|
| 1,119,011 | 12/1914 | Grosvenor | 62/238 |
| 2,082,486 | 6/1937 | Frenkel | 34/77 |
| 2,492,754 | 12/1949 | Martin, Jr. | 34/48 |
| 2,952,297 | 9/1960 | Hollis | 34/119 |
| 3,798,785 | 3/1974 | Chambuton | 34/54 |

Primary Examiner—John J. Camby
Assistant Examiner—Larry I. Schwartz
Attorney, Agent, or Firm—Jones, Thomas, Askew

[57] ABSTRACT

The low temperature heat recovery system is used in combination with apparatus for drying a moving web of paper or the like and comprises a steam circuit, a gas circuit and a refrigerant circuit. The steam circuit recovers condensed steam from the rotary cylinders of the paper dryer, reheats the steam and injects the steam back into the rotary cylinders or back into the steam main. The gas circuit removes the wet air from the dryer housing, extracts the moisture and the latent heat from the air, reheats the air and injects the air back into the housing. The refrigerant circuit functions as a heat pump to heat the steam and air prior to injecting the steam and air into the cylinders and housing, and cools the air to condense and extract the moisture from the air.

8 Claims, 1 Drawing Figure

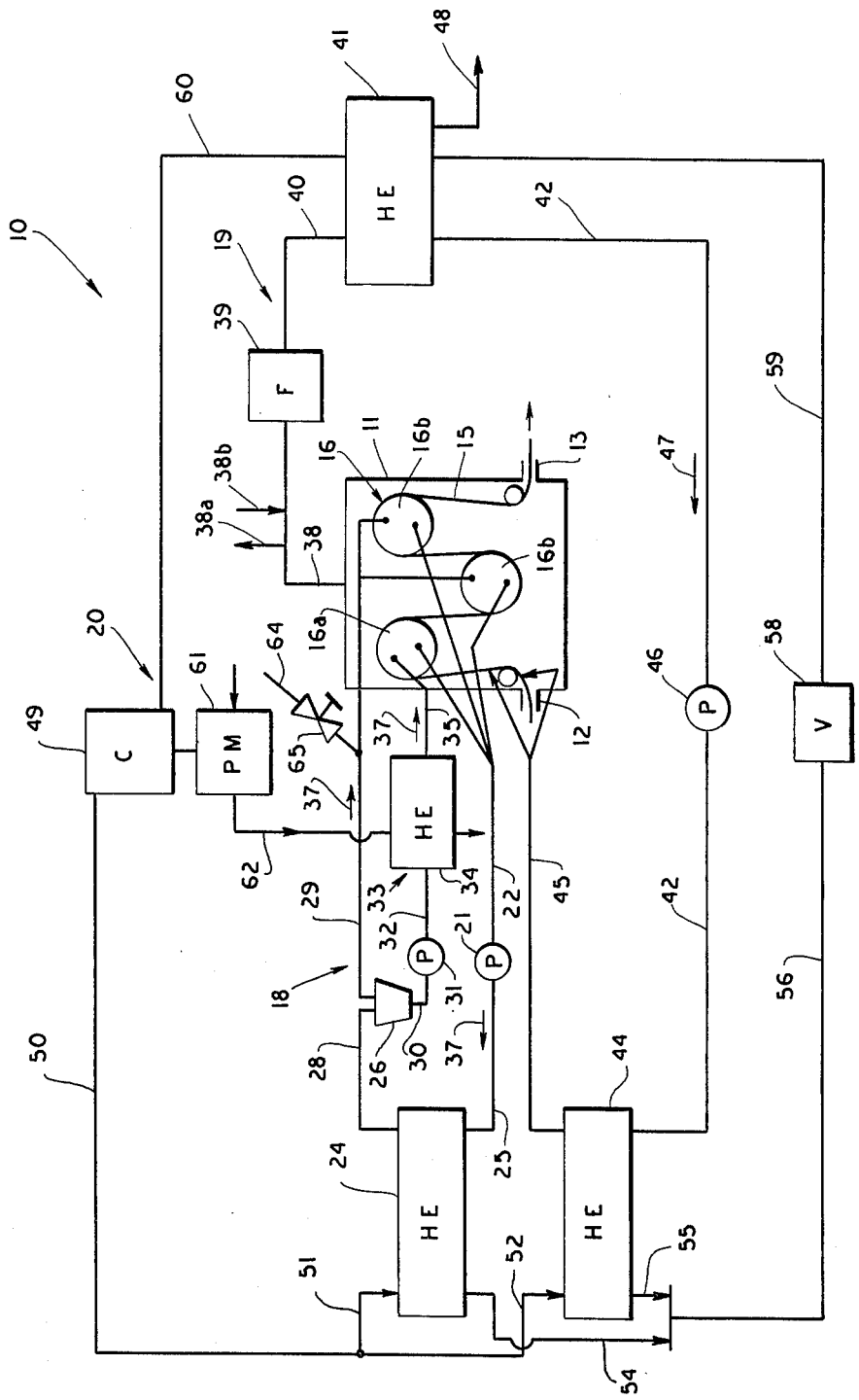

DRYER WITH LOW TEMPERATURE HEAT RECOVERY SYSTEM

BACKGROUND OF THE INVENTION

In the manufacture of paper and certain textile products and in other applications such as food drying, it is common practice to apply heat to a continuous moving web of paper or web of a textile product or other material to dry the web in the manufacturing process. Because of the enormous quantities of textiles, papers, and other products which are continously manufactured, an enormous amount of heat must be generated in the various drying processes. Both direct and indirect drying processes have been used, but the indirect drying systems are used more frequently for materials with relatively high water content.

Where it is possible, it is desirable to use the heat generated in a dryer system as effectively as practical so as to reduce the expense of generating the heat for the system. In many situations, it is possible to recover and recirculate the heat generated in such a system, and the recovery and reuse of the heat usually results in substantial savings to the user.

For example, a typical paper dryer used in a paper manufacturing process might include a large substantially closed housing which confines eighty rotary drums or cylinders about which the web of paper travels. The dryer housing may be 300 feet long, 50 feet high and 30 feet wide, and the continuous web of paper is fed into one end of the housing and about the rotary cylinders in the housing and then out of the other end of the housing. Heat in the form of steam is injected into the rotary cylinders so as to heat the web passing about the cylinders, and hot dry air is passed through the housing to heat the web of paper and to remove the moisture from the paper. It is estimated that paper dryers of this type use approximately 40% of the energy required to operate a paper manufacturing plant, and that paper manufacturing plants use as much as 7% of the energy in the United States. Because of this enormous energy requirement to manufacture paper, it is highly desirable to recover and recirculate the heat generated for the purpose of operating paper dryers.

While energy recovery devices have been conceived for paper and other dryers in the past, as exemplified by U.S. Pat. Nos. 3,798,785 and 2,492,754, the amount of energy recovered or method of operation of the prior art devices is not satisfactory.

SUMMARY OF THE INVENTION

Briefly described, the present invention comprises a low temperature heat recovery system for paper dryers and other drying systems wherein heat used in the drying process is continuously recovered and reused. The indirect dryer includes a plurality of rotary drums or cylinders located in a substantially closed housing, and a web of material passes through the housing and about the rotary cylinders. The rotary cylinders are heated with steam, and the steam condenses on the inside surface of the cylinders. The condensed steam in the form of liquid is extracted from the rotary cylinders, reheated and reinjected into the rotary cylinders or to a steam main in a substantially closed steam circuit. Hot dry air is injected into the housing about the surface of the web of material moving through the housing so as to heat and dry the web of material, and the air is extracted from the housing in a wet condition, the moisture and energy extracted from the air, and the dry air is reheated and reinjected into the housing in a substantially closed gas circuit. A refrigerant heats the steam heat exchanger and one of the gas heat exchangers and cools the other gas heat exchanger in a closed heat pump or refrigerant cycle.

Thus, it is an object of the present invention to provide a new and improved heat recovery system which functions to economically recover and recirculate heat in a dryer or a paper manufacturing aparatus, or the like.

Another object of the present invention is to provide a new and improved heat recovery system for a paper dryer or the like wherein heat from the steam injection to the rotary cylinders and heat from the air injected into the housing is recovered and recirculated in the system.

Another object of the invention is to provide a dryer for a paper manufacturing process or the like which is economical to operate.

Other objects, features and advantages of the present invention will become apparent when taken in conjunction with the accompanying drawing.

BRIEF DESCRIPTION OF THE DRAWING

The single FIGURE of the drawing illustrates in schematic form a paper dryer or the like and heat recovery system used in conjunction therewith.

DETAILED DESCRIPTION

Referring now in more detail to the drawing, the indirect dryer 10 includes a substantially closed housing 11 having a material inlet 12 and an outlet 13. A continuous web 15 of material passes through the housing. A plurality of rotary drums or cylinders 16 are located in the housing and the web 15 of material passes about the convex surfaces of the cylinders. While the housing 11 is shown as being relatively small and only three rotary cylinders 16 are illustrated in the housing, it will be understood by those skilled in the art that the housing is large enough to accommodate many rotary cylinders, with typical housings being as large as 300 feet long, 30 feet wide and 50 feet high or larger.

The heat recovery system used in conjunction with the dryer 10 comprises three basic circuits which are designated herein as a steam circuit 18, a gas circuit 19, and a refrigerant circuit 20. The steam circuit 18 functions to remove the condensed steam in liquid form from the rotary cylinder 16, regenerate the steam and inject the steam back into the cylinders, and the steam circuit includes a header system (not shown) connected to each rotary cylinder 16 so as to supply live steam to the rotary cylinders and to extract steam in the form of condensed liquid from the cylinders. The drawing illustrates in schematic form a pump 21 and conduit 22 communicating at one of its ends with the pump 21 and at the other of its ends through several branches to the rotary cylinders 16. An indirect steam heat exchanger 24 is in circuit 18 and communicates through conduit 25 with the outlet of pump 21. Water and steam trap 26 communicates with heat exchanger 24 through conduit 28, and steam supply line 29 communicates with the steam injection inlets of each of the rotary cylinders 16. Liquid supply line 30 communicates at one of its ends with liquid steam trap 26 and at its other end with pump 31. Pump 31 is connected through its outlet conduit 32 through hot exhaust heat exchanger 34 and then through high temperature steam conduit 35 to rotary cylinders 16. Conduits 30, 32, and 35, pump 31 and heat exchanger 34 form a branch flow system 33 for generating high temperature steam. The high temperature steam conduit 35 communicates with the first rotary cylinders 16 requiring the highest temperature as indicated at 16a, while the steam supply conduit 29 communicates with the remaining rotary cylinders indicated as 16b. Pumps 21 and 31 urge the steam in the directions indicated by arrows 37, with pump 31 functioning as a booster pump to increase the pressure of the high temperature steam passing from hot exhaust heat exchanger 34 to rotary cylinders 16.

The steam regenerated by steam heat exchanger 24 is raised from below boiling temperature to a temperature range from 250° F. to 300° F., or higher depending on the application and is injected in the rotary cylinders 16b at approximately this temperature. The high temperature steam passing from hot exhaust heat exchanger 34 is in a temperature range from 300° F. to 450° F. or higher depending on the application and is injected into the first rotary cylinders 16a at approximately this temperature.

The gas circuit 19 functions to remove water from the web of material 15, to extract wet gas from housing 11, to condense the water vapor and release latent heat, to heat the air, and to redirect the dry hot air back into the housing. Wet air is extracted from housing 11 by the gas circuit 19 with the gas being exhausted through conduit 38 and flowing to the filter 39 which is a bag house or other suitable filter. The gas moves from filter 39 through conduit 40 to first gas heat exchanger 41, then through conduit 42 to second gas heat exchanger 44, then through conduit 45 back to housing 11. A pump means such as fan 46 is in conduit 42 and induces the flow of air in the direction indicated by arrow 47. Conduit 45 extends on into housing 11 and directs the flow of recirculated gas against the surface of web material 15 moving through the housing at several locations in the housing. In order to maintain a pressure balanced system, a part of the wet air removed from housing 11 through conduit 38 is expelled to the atmosphere through branch conduit 38a, and a new supply of atmospheric air is introduced to the gas circuit through branch conduit 38b.

The gas removed from housing 11 is at a temperature as near 212° F. as practical and at approximately 85% humidity. The first gas heat exchanger 41 reduces the temperature of the gas to about 165° F. or lower. Heat exchanger 41 is an evaporator for the refrigerant cycle and its chilling function extracts moisture from the gas, with the moisture leaving the evaporator through drain conduit 48. When the gas passes through second gas heat exchanger 44 the temperature of the gas is raised from about 165° F. to approximately 240° F. depending on the application, and the heated dried gas enters the housing at approximately this temperature and at a relative humidity of approximately 50%.

The refrigerant circuit 20 functions as a heat pump and transfers heat to the steam heat exchanger 24, transfers heat to the second gas heat exchanger 44, and extracts heat from the first gas heat exchanger 41. The refrigerant circuit 20 includes a compressor 49 which functions as a means to raise the temperature and pressure of a refrigerant such as Freon 113 in a gaseous state, with the temperature of the refrigerant leaving the compressor at approximately 10° F. higher than the steam temperature in conduit 28. The refrigerant vapor is moved by the compressor 49 in parallel through steam heat exchanger 24 and through second gas heat exchanger 44 by means of conduits 50, 51, and 52. The heat exchangers 24 and 44 are indirect heat exchangers which maintain the fluids in separate circuits.

When the refrigerant vapor leaves heat exchangers 24 and 44 through exhaust conduits 54, 55 and 56, the refrigerant vapor will be at a temperature of approximately 230° F. or less and at or near a compressed liquid state. The refrigerant moves through throttling valve 58 which reduces the pressure and temperature of the refrigerant and then through conduit 59 to first gas heat exchanger 41. The throttling valve 58 reduces the temperature of the refrigerant to approximately 5° F. less than the temperature of condensed water in drain conduit 48. As the refrigerant liquid passes through the first gas heat exchanger 41, it enters the heat exchanger in a saturated state and exits from the first gas heat exchanger 41 at approximately the same temperature but in a superheated state. Conduit 60 directs the refrigerant vapor back to the inlet of compressor 49.

Compressor 49 is driven by a hot exhaust prime mover 61 which operates on a combustible fuel. The hot exhaust from the prime mover 61 is directed through conduit 62 through hot exhaust heat exchanger 34 and functions to heat the water from steam trap 26 into high temperature steam prior to the injection of the steam into the first rotary cylinders of the dryer.

During the start-up of the dryer 10, it is desirable to supply a source of steam to the rotary cylinders, and an extra conduit 64 communicates with a boiler (not shown), and the flow of steam from the boiler to the dryer system is controlled by valve 65. If one or more elements of the steam circuit should malfunction, it is possible to continue the operation of the dryer by the injection of steam from conduit 64. Also, it is desirable to be able to inject additional steam in the steam circuit 18 during continuous operation of the circuit.

Although the refrigerant circuit 20 is disclosed as having an expansion valve 58, it will be understood by those skilled in the art that an expansion turbine or other apparatus can be substituted for the expansion valve. While a prime mover 61 is disclosed as being of the type having a hot exhaust, it will be understood that other prime movers can be utilized, such as steam turbines or electric motors. When this alternate type of prime mover is used in the system the branch flow system 33 which includes the hot exhaust conduit 62 and the hot exhaust heat exchanger 34 and their related elements will be omitted from the system. It will be understood that the temperatures and pressures disclosed herein may be varied as necessary to meet the particular operating conditions, and that various other modifications and alterations can be made within the spirit and scope of the invention as described hereinbefore and as defined in the appended claims.

We claim:

1. In a process of drying wet products such as textile or paper webs wherein a web is moved along its length through a housing and progressively about the convex surfaces of a plurality of rotary cylinders or the like in the housing and steam is injected into the rotary cylinders to heat the cylinders and the web as the web moves about the cylinders, the improvement comprising removing water from the condensed steam in the cylinders, heating the removed water until steam is regenerated from the water, separating any water from the regenerated steam, injecting the regenerated steam into the rotary cylinders, heating the separated water until a high temperature steam is formed at a temperature higher than the temperature of the regenerated steam, and injecting the high temperature steam into the rotary cylinders, removing gas from the housing, removing moisture from the gas, heating the gas, and directing the gas back to the housing against the web as the web moves through the housing, heating a fluid to a gaseous state, and wherein the step of heating the removed water comprises heating the removed water by condensing the heated fluid from a gaseous state, to a liquid state and wherein the step of heating the gas comprises heating the gas by condensing the heated fluid from a gaseous state to a liquid state, and wherein the step of removing the moisture from the gas comprises cooling the gas with the condensed fluid in a liquid state while simultaneously converting the fluid from a liquid state to a gaseous state for reheating and recycling.

2. The process of claim 1 and wherein the step of injecting the high temperature steam into the rotary cylinders comprises injecting the high temperature steam into a first plurality of the rotary cylinders about which the web first moves as the web moves through the housing and wherein the step of injecting the regenerated steam into the rotary cylinders comprises injecting the regenerated steam into a second plurality of the rotary cylinders about which the web subsequently moves as the web moves through the housing.

3. In a process of drying wet products such as textile or paper webs wherein a web is moved along its length through a housing and progressively about the convex surfaces of rotary cylinders or the like in the housing and steam or the like is injected into the rotary cylinders to heat the cylinders and the web moving about the cylinders, the improvement comprising continuously recycling three fluids in separate substantially closed heat exchange circuits, including the cycle of removing condensed steam in a liquid state from the rotary cylinders, heating the liquid from a liquid state to regenerate steam, and injecting the regenerated steam back into the rotary cylinders, the cycle of removing gas from the housing, removing moisture and latent heat from the gas, heating the gas, and directing the heated gas back into the housing, and the cycle of heating a refrigerant fluid in a gaseous state, giving up heat from the refrigerant fluid in the step of heating the condensed steam in a liquid state from a liquid state into steam, giving up heat from the refrigerant fluid in the step of heating the gas, and absorbing heat in the refrigerant fluid in the step of removing moisture from the gas.

4. The process of claim 3 and further including the step of reducing the pressure and temperature of the refrigerant fluid to convert the fluid from a gaseous state to a liquid state prior to the step of absorbing heat in the refrigerant, and wherein the step of absorbing heat in the refrigerant comprises converting the refrigerant from a saturated liquid-vapor state to a gaseous state.

5. The process of claim 3 and further including the steps of separating liquid from the regenerated steam, heating the separated liquid to a temperature higher than the temperature of the regenerated steam to form a high temperature steam, injecting the high temperature steam into a first plurality of the rotary cylinders about which the web first moves as the web moves through the housing, and wherein the step of injecting the regenerated steam back to the rotary cylinders comprises injecting the regenerated steam into a second plurality of rotary cylinders about which the web moves as the web moves through the housing.

6. In apparatus for drying wet products such as textile or paper webs including a housing and a plurality of rotary cylinders in said housing about which the web moves, the improvement therein comprising a steam circuit for removing condensed steam in liquid form from said rotary cylinders and for injecting regenerated steam into said rotary cylinders, pump means in said steam circuit for moving steam through said steam circuit, and a steam heat exchanger in said steam circuit for heating the condensed steam in liquid form to a temperature sufficient to regenerate steam, a gas circuit for removing wet air from said housing and for injecting dry gas into said housing, a first gas heat exchanger in said gas circuits for cooling the gas and removing moisture from the gas, a second gas heat exchanger in said gas circuit for heating the gas, and pump means for moving gas through said gas circuit, a refrigerant circuit in communication with said steam heat exchanger and said first and second gas heat exchangers for exchanging heat with said steam circuit and said gas circuit comprising compressor means for raising the pressure and temperature of a refrigerant fluid in a gaseous state and moving the refrigerant gas through the refrigerant circuit of said steam heat exchanger and of said second gas heat exchanger, pressure reducing means including an inlet in communication with the refrigerant circuit of said steam heat exchanger and of said second gas heat exchanger and an outlet in communication with the refrigerant circuit of said first gas heat exchanger, and said compressor means being in communication with the refrigerant circuit of said first gas heat exchanger.

7. The apparatus of claim 6 and further including a hot exhaust prime mover for driving said compressor means, a hot exhaust heat exchanger heated by the hot exhaust of said prime mover and wherein said steam circuit comprises liquid separator means for separating liquid from the regenerated steam, a branch flow system with an inlet in communication with said liquid separate means and an outlet in communication with said rotary cylinders, said branch flow system arranged to direct the separated liquid through said hot exhaust heat exchanger.

8. In a process of drying wet products such as textile or paper webs wherein a web is moved along its length through a housing and progressively about the convex surfaces of rotary cylinders in the housing and steam or the like is injected into the rotary cylinders to heat the cylinders and the web moving about the cylinders, the improvement comprising continuously recycling three fluids in a separate substantially closed heat exchange circuits, including the cycle of removing the condensed steam in a liquid state from the cylinders, heating the liquid to regenerate steam, separating liquid from the regenerated steam, heating the separated liquid to a temperature higher than the temperature of the regenerated steam to form a high temperature steam, injecting the high temperature steam into a first plurality of the rotary cylinders about which the web first moves as the web moves through the housing, injecting the regenerated steam back into a second plurality of the rotary cylinders about which the web moves after moving about the first plurality of the rotary cylinders, the cycle of removing gas from the housing, removing moisture and latent heat from the gas, heating the gas, and directing the heated gas back into the housing, and the cycle of heating a refrigerant fluid in a gaseous state, giving up heat from the refrigerant fluid in the step of heating the condensed steam in a liquid state from a liquid state into steam, giving up heat from the refrigerant fluid in the step of heating the gas, and absorbing heat in the refrigerant fluid in the step of removing moisture from the gas, and wherein the step of heating a refrigerant fluid in a gaseous state comprises compressing the refrigerant fluid with a compressor and driving the compressor with a hot exhaust prime mover, and wherein the step of heating the separated liquid comprises heating the separated liquid with the hot exhaust from the prime mover.

* * * * *